(12) United States Patent
Ewert et al.

(10) Patent No.: US 8,340,713 B2
(45) Date of Patent: Dec. 25, 2012

(54) METHOD AND DEVICES FOR SUPPORTING MESSAGE SERVICES TO A DUAL MODE MOBILE STATION VIA A SESSION INITIATION PROTOCOL

(75) Inventors: Joerg Christian Ewert, Erkelenz (DE); Andreas Witzel, Herzogenrath (DE); Martin Stumpert, Hochspeyer (DE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 746 days.

(21) Appl. No.: 11/577,640

(22) PCT Filed: Oct. 22, 2004

(86) PCT No.: PCT/EP2004/011966
§ 371 (c)(1),
(2), (4) Date: Jan. 22, 2009

(87) PCT Pub. No.: WO2006/045325
PCT Pub. Date: May 4, 2006

(65) Prior Publication Data
US 2009/0117937 A1    May 7, 2009

(51) Int. Cl.
*H04M 1/00*    (2006.01)
(52) U.S. Cl. .......... 455/552.1; 455/465; 455/456.1; 455/426.1
(58) Field of Classification Search .......... 455/465, 455/552.1, 456.1, 426.1
See application file for complete search history.

(56) References Cited

U.S. PATENT DOCUMENTS

2002/0110104 A1    8/2002 Surdilla et al.
2003/0134650 A1*   7/2003 Sundar et al. .......... 455/465
2004/0203914 A1*  10/2004 Kall et al. ............. 455/456.1

FOREIGN PATENT DOCUMENTS

WO    WO 03/061177 A    7/2003
WO    WO 03/103308 A    12/2003

* cited by examiner

*Primary Examiner* — David Q Nguyen

(57) ABSTRACT

The invention relates to methods and devices for supporting the sending of a message to a dual mode mobile station.

10 Claims, 3 Drawing Sheets

METHOD AND DEVICES FOR SUPPORTING MESSAGE SERVICES TO A DUAL MODE MOBILE STATION VIA A SESSION INITIATION PROTOCOL

TECHNICAL FIELD

The present invention relates to methods and devices for handling a call involving a mobile station adapted to co-operate with a first access network comprising a device operating according to a session initiation protocol and a second access network wherein the second access network is a cellular access network.

RELATED ART

In recent years the percentage of household having a broadband connection at home was increasing. Today 11% of the households in Germany are equipped with a broadband connection (mainly ADSL). In Sweden the percentage is already 22% (50% ADSL, 50% other technologies). It is expected that these percentages will increase significantly over the next years. Many of these users will install private WLAN (Wireless Local Area Network)-access points to connect their PCs (Personal Computers), PDA (Personal Digital Assistants), mobile phones etc. to their fixed broadband connection.

Furthermore, it is expected that the number of public WLAN-hot spots in Europe will increase from approx. 18.000 (2003) to 36.000 (2009).

Parallel, to the increased number of broadband connections the users are starting to use IP (Internet Protocol) telephony over their WLAN-broadband connection via PCs and PDAs. In the next years mobile phone vendors will launch so-called GSM/WLAN dual mode phones (e.g. Nokia 2005).

For these users of the GSM/WLAN dual mode phones it will be quite easy to originate calls via the SIP-client over the WLAN-radio interface towards other SIP-clients connected to the same network or even to the internet.

Today several architectures are proposed how to integrate cellular networks with WLAN-access points. The main focus is the integration of the WLAN-access point towards the packet switching network.

For example Mobile@home proposes an architecture where the WLAN-access point is connected via a broadband connection to the BSC. The disadvantage of this solution is that the same operator has to supply the cellular mobile network and the broadband connection. Furthermore, Mobile@home proposes a solution based on the ADSL (Asymmetric Digital Subscriber Line) technology.

However none of the current solutions provides mechanisms and devices for handling a message service to a mobile station that is connected by a connection via a WLAN access network to a mobile station.

Therefore it is object of the invention to provide methods and devices to overcome the shortcomings of the prior art.

SUMMARY

This will be solved advantageously by the method of claim 1, the database of claim 4, and the system of claim 5. Further advantageous embodiments can be derived from the dependent claims.

The invention introduces a method for providing a mobile station with a message, wherein the mobile station is adapted to co-operate with a first access network comprising a device operating according to a session initiation protocol and a second access network wherein the second access network is a cellular access network. The method comprises the steps of receiving a request for sending the message to the mobile station, determining that the mobile station can be reached via the first access network, wherein the first access network does not support the message service, sending the message to a control node of a cellular telecommunications network, and the node sending the message towards the mobile station.

In an embodiment of the invention, the step of sending comprises converting the message into at least one message that can be transmitted according to a Session Initiation Protocol, sending the message to the device operating according to a session initiation protocol, and the method comprises the additional steps of forwarding from the device the contents of the message to the mobile station.

In an embodiment of the invention the step of sending is implemented by sending the message via the second application network.

The invention further introduces a database for storing subscriber data for a telecommunications network comprising a first access network not supporting a message service and comprising a device operating according to a session initiation protocol and a second access network wherein the second access network is a cellular access network. The database is adapted to receive an indication that a mobile station can be reached via the first network, characterised by that the database is adapted to send an alert message to a message service support node for indicating that a message can be delivered. The database can be implemented for example by a home location register or a home subscriber server or a AAA server.

The invention further introduces a system for telecommunications connected to a first access network reachable via a device operating according to a session initiation protocol and a second access network wherein the second access network is a cellular access network, a database for storing subscriber data, a service node for supporting a message service, a control node for performing call control functions and a function for converting signaling messages. The database is adapted to send an indication to the service node that a message can be sent towards the mobile station on reception of an indication that a mobile station is reachable via the first access network.

In an embodiment of the invention, the first access network is one of a wireless local are network, a bluetooth network, a short range radio network, a fixed network, or an optical network.

DETAILED DESCRIPTION

In the following the invention will be further described by means of examples and by means of figures.

It should be noted that the WLAN access is just an exemplary embodiment and could be replaced by any other access technology as for example Bluetooth, optical connection, short range radio or fixed line connection. In particular access technology with lower costs on transmission resources like bandwidth than the GSM or WCDMA technology can be used advantageously for the further access.

It should be further noted that for an implementation of the invented methods, the access point adapted to communicate over a radio, fixed or optical connection to mobile station, may be connected by any means to a domain operating according to a session initiation protocol and transmitting data according to an internet protocol.

The short message service is just an example for messaging services like paging, multi media messages and alike.

Figure 1A:
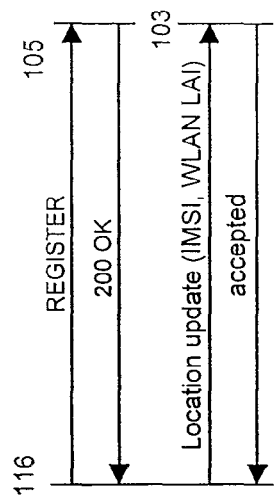
FIG. 1a depicts a registration of a dual mode mobile station with a SIP proxy, (state of the art) and the indicating of this to the telecommunications network.
Figure 1:
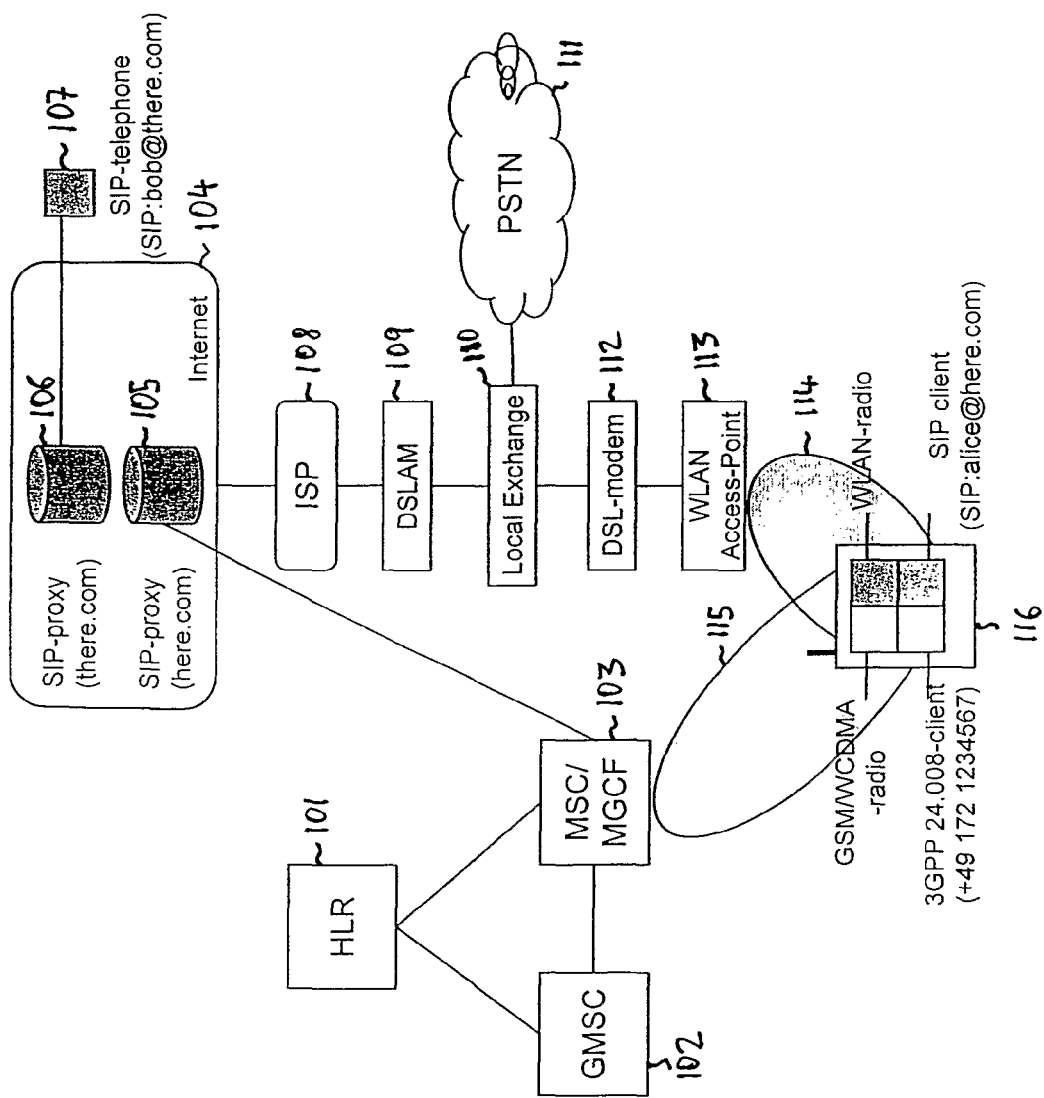
FIG. 1 depicts an architecture for enabling a mobile station to access a telecommunications network via a further access network.

FIG. 1 depicts an architecture for enabling a mobile station to access a telecommunications network via a further access network, comprising an home location register 101, a gateway mobile services switching centre, a combined mobile services switching centre/media gateway control function 103 which are connected to each other. In another embodiment of the invention the mobile services switching centre and the media gateway control function are not combined but just interconnected. The combined mobile services switching centre/media gateway control function 103 is further connected to an internet domain 104 comprising a first SIP (Session Initiation Protocol) proxy (proximity server) 105 and a second SIP proxy 106 that is connected to telephone 107 adapted to send signals according to SIP. The internet domain is connected via an ISP (Internet Service Provider) 108 and a DSLAM (Digital Subscriber Line Access Multiplexer) 109 to a local exchange 110 which is connected to a public switched telephony network 111. The local exchange is further connected via a DSL (Digital Subscriber Line) modem 112 to a WLAN-access Point 113.

A mobile station 106 is connected via a WLAN radio connection to the WLAN Access Point and via a GSM or WCDMA radio connection to the mobile services switching centre/media gateway control function.

According to the invention, the mobile station 116 can use the WLAN radio connection to register in the first SIP proxy 105. The details of the registration will be explained in FIG. 1a. FIG. 1a depicts a registration of the mode mobile station 116 with the first SIP proxy 105. This is state of the art. To that end the mobile station 106 sends a SIP register message towards the SIP proxy 105 via the WLAN radio connection. After successful registration the SIP proxy returns a 200 OK message to the mobile station. After receiving this confirmation that the registration has been successful the mobile station sends an indication that it can be reached via the SIP proxy to the mobile services switching centre via the GSM or WCDMA connection by sending a location update message. The mobile services switching centre stores the indication in a visitor location register. It returns an accepted message to indicate the reception of the location update.

In an embodiment of the invention the indication is stored in a home location register or a home subscriber server.

The sending of the indication can be implemented in several ways. It can be sent for example in a USSD (Unstructured Supplementary Service Data) message or any other signaling means between mobile station and mobile services switching centre. In the preferred embodiment it is included in a location update message. Independent from the means used for transporting the information from mobile station to mobile services switching centre, the information can be sent as a simple indication, for example a flag, indicating that an alternative access technology is available. In that case one can always use the same predefined device for routing calls from the mobile services switching centre/media gateway control function to the mobile station. Such device can be for example an interrogating call session control function as defined in the 3GPP recommendation 29.163 version 6.2.0 of March 2004. If not always the same device is used a device must be identified.

In a preferred embodiment of the invention the SIP proxy is identified by an identification of the mobile station. To that end, an identification of the mobile station, e.g. the MSISDN or the IMSI, is stored in a table or a database in association with an identification of the SIP proxy, conveniently this can be the address of the SIP proxy. In a further embodiment of the invention, the mobile station identification can be related to an operator and the operator identification can be stored in relation to the SIP proxy identification.

Alternatively, a device can be identified for example by determining location information of the mobile station like a location area or geographical coordinates and using a mapping table that maps said location information to an address. A further way to address the mobile station is the use of an ENUM (tElephone NUmber Mapping) database as defined in IETF (Internet Engineering Task Force) RFC 3761. The ENUM database maps the telephone number, for example the IMSI (International Mobile Subscriber Identity) of the mobile station, to an IP address. A further way is the transmission of a location area identifier in the location update message. The location area identifier carries an identification of the SIP proxy or of an access point, for example an ESSID (Extended Services Set IDentification), a domain name or a WLAN location area identification.

Figure 2:
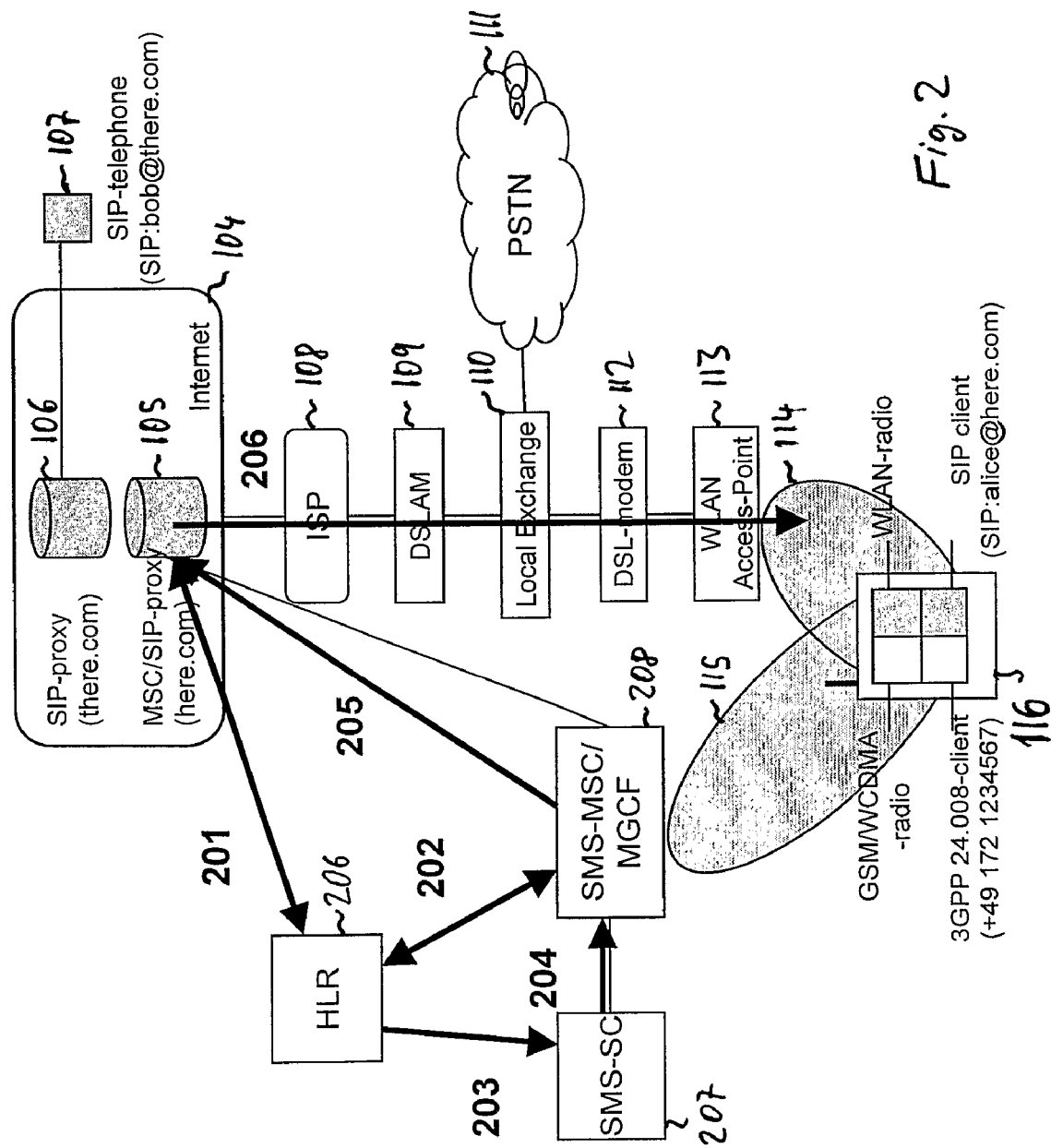
FIG. 2 depicts the provision of a message to a mobile station according to the invention.

FIG. 2 depicts the architecture of FIG. 1 from the WLAN access point 113 to the SIP proxy 105 as well as the further SIP proxy 106 and the SIP telephone 107. Furthermore the cellular telecommunications network is depicted by means of a combined media gateway control function/mobile services switching centre 208, a SMS (Short Message Service) service centre 207 and a home location register 206. The mobile station 116 is currently registered with the SIP proxy 105. The SIP server 105 sends an indication that the mobile station 116 can be reached via the first access network, a WLAN access network, to the home location register in a step 201. The home location register 206 determines that the combined media gateway control function/mobile services switching centre 208 is serving the mobile station in a step 202. The home location register stores the indicator and sends a message to the SMS service centre in a step 203 indicating that the mobile station can be reached via the combined media gateway control function/mobile services switching centre 208. The combination of the media gateway control function and the mobile services switching centre is an implementation and not necessary for the invention. Both nodes could be implemented separated as well. The SMS service centre sends the short message to the combined media gateway control function/mobile services switching centre in a step 204. The mobile services switching centre forwards the short message to the media gateway control function which converts it into at least one message that can be transmitted according to a SIP protocol and forwards this at least one message to the SIP proxy 105. The SIP proxy 105 delivers the at least one message to the mobile station via the first access network in a step 206.

In an embodiment of the invention the protocol conversion is performed in the SIP server.

Figure 3:
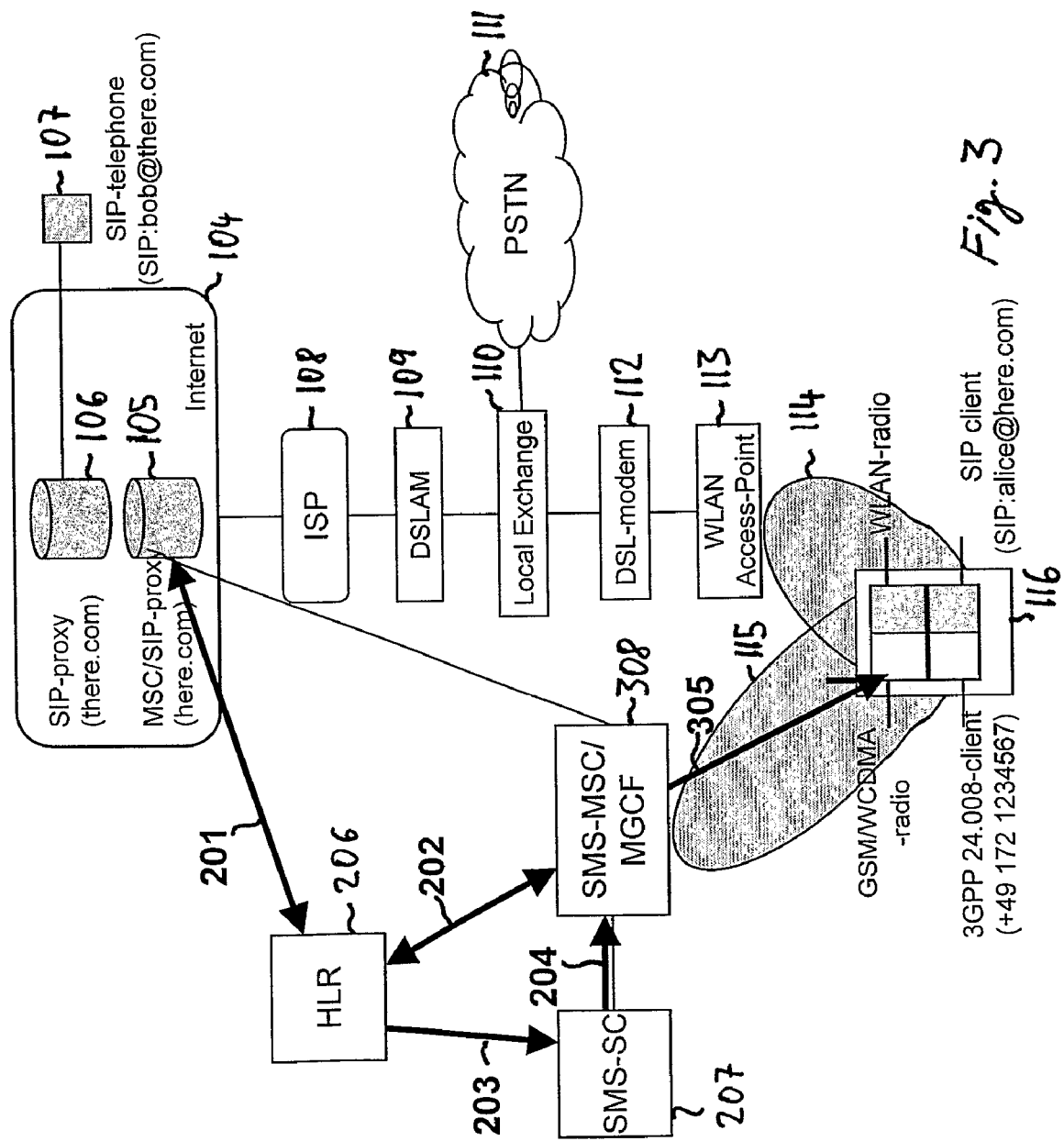
FIG. 3 depicts the an alternative provision of a message to a mobile station according to the invention.

FIG. 3 depicts an alternative provision of a message to a mobile station. FIG. 3 shows the architecture of FIG. 1 from the WLAN access point 113 to the SIP proxy 105 as well as the further SIP proxy 106 and the SIP telephone 107. Furthermore the cellular telecommunications network is depicted by means of a combined media gateway control function/mobile services switching centre 308, the SMS (Short Message Service) service centre 207 and the home location register 206. The mobile station 116 is currently registered with the SIP proxy 105. The SIP server 105 sends an indication that the mobile station 116 can be reached via the first access network, a WLAN access network, to the home location register in a step 201. The home location register 206 determines that the combined media gateway control function/mobile services switching centre 208 is serving the mobile station in a step 202. The home location register stores the indicator and sends a message to the SMS service centre in a step 203 indicating that the mobile station can be reached via the combined media gateway control function/mobile services switching centre 308. The combination of the media gateway control function and the mobile services switching centre is an implementation and not necessary for the invention. Both nodes could be implemented separated as well, whereas for the depicted implementation the media gateway control function is redundant. The SMS service centre sends the short message to the combined media gateway control function/mobile services switching centre in a step 204. The mobile services switching centre forwards the short message via the cellular telecommunications access network 115 to the mobile station.

In a preferred embodiment of the invention, the mobile station comprises a first part operating according to at least one protocol used via the first access network, for example WLAN protocols and SIP, and a second part operating according at least one protocol used via the cellular access network. The mobile station can send a message originating in the first part via the first access network as a message that can be transmitted according to a SIP protocol. If the message is addressed to a terminal that does not operate according to a SIP protocol, the message is converted either in the SIP proxy or a media gateway control function.

Accordingly, a message originating in the SIP telephone 107 can be transmitted as a message that can be transmitted according to a SIP to the first part of the mobile station.

The invention claimed is:

1. A method for providing a mobile station with a message, wherein the mobile station is adapted to co-operate with a first access network comprising a plurality of devices operating according to a session initiation protocol and a second access network wherein the second access network is a cellular access network, said method comprising the following steps:
   receiving via said second access network a request for sending the message to the mobile station,
   determining that the mobile station can be reached via the first access network, wherein the first access network does not support the message service,
   identifying one device of said plurality of devices by means of one of an identification of the mobile station, a location information of the mobile station, an ENUM database or a location area identifier,
   sending the message to a control node of a cellular telecommunications network,
   converting the message into at least one message that can be transmitted according to a Session Initiation Protocol, and
   the control node sending the message towards the mobile station via said first access network.

2. The method according to claim 1, wherein the step of sending the message towards the mobile station comprises:
   sending the message to said identified one device of said plurality of devices operating according to session initiation protocol, and
   forwarding from said identified one device of said plurality of devices the contents of the message to the mobile station.

3. The method according to claim 1, wherein the step of sending is implemented by sending the message via said second access network.

4. The method of claim 1, further comprising:
   the location area identifier including an identification of a proxy of the session initiation protocol or access point or
   the mobile station identification being stored in a database in association with the identification of the proxy of the session initiation protocol.

5. A method for a Short Message Service Center for providing a mobile station with a message, wherein the mobile station is adapted to co-operate with a first access network comprising a plurality of devices operating according to a session initiation protocol and a second access network wherein the second access network is a cellular access network, said method comprising the following steps:
   receiving via said second access network a request for sending the message to the mobile station,
   receiving data indicating that the mobile station can be reached via the first access network, wherein the first access network does not support the message service,
   receiving data identifying one device of said plurality of devices by means of one of an identification of the mobile station, a location information of the mobile station, an ENUM database or a location area identifier,
   converting the message into at least one message that can be transmitted according to a Session Initiation Protocol, and
   sending the message to a control node of a cellular telecommunications network via said first access network.

6. The method according to claim 5, wherein the step of sending comprises converting the message into at least one message that can be transmitted according to a Session Initiation Protocol, sending the message to said identified one device of said plurality of devices operating according to a session initiation protocol.

7. The method according to claim 5, wherein the step of sending is implemented by sending the message via said second access network.

8. A database for storing subscriber data for a telecommunications network comprising a first access network not supporting a message service and a plurality of devices operating according to a session initiation protocol and a second access network wherein the second access network is a cellular access network, wherein the database comprises:
   means to receive an indication that a mobile station can be reached via the first network,
   means to send an alert message to a message service support node for indicating that a message can be delivered,
   means to provide data indicating that the mobile station can be reached via the first access network, wherein the first access network does not support the message service,
   means for converting the message into at least one message that can be transmitted according to a Session Initiation Protocol, and
   means to provide data identifying one device of said plurality of devices utilizing an identification of the mobile station, a location information of the mobile station, an ENUM database or a location area identifier.

9. A system for telecommunications connected to a first access network offering services via a plurality of devices operating according to a session initiation protocol and a second access network wherein the second access network is a cellular access network, the system comprising:

a service node for supporting a message service,
a control node for performing call control functions and a function for converting signalling messages,
a database for storing subscriber data,
- the database being adapted to send an indication to the service node that a message can be sent towards the mobile station on reception of an indication that a mobile station is reachable via the first access network, the message being converted into at least one message that can be transmitted according to a Session Initiation Protocol,
- the database being further adapted to provide data indicating that the mobile station can be reached via the first access network, wherein the first access network does not support the message service, and
- the database comprising means to provide data identifying one device of said plurality of devices by means of an identification of the mobile station, a location information of the mobile station, an ENUM database or a location area identifier.

10. The system according to claim 9, wherein the first access network is one of a wireless local are network, a bluetooth network, a short range radio network, a fixed network, or an optical network.

* * * * *

UNITED STATES PATENT AND TRADEMARK OFFICE
CERTIFICATE OF CORRECTION

PATENT NO. : 8,340,713 B2
APPLICATION NO. : 11/577640
DATED : December 25, 2012
INVENTOR(S) : Ewert et al.

It is certified that error appears in the above-identified patent and that said Letters Patent is hereby corrected as shown below:

In Column 2, Line 43, delete "are network," and insert -- area network, --, therefor.

In Column 2, Line 58, delete "the an" and insert -- an --, therefor.

In Column 8, Line 9, in Claim 10, delete "are network," and insert -- area network, --, therefor.

Signed and Sealed this
Second Day of April, 2013

Teresa Stanek Rea
*Acting Director of the United States Patent and Trademark Office*